(12) United States Patent
Asai (10) Patent No.: US 7,612,908 B2
(45) Date of Patent: Nov. 3, 2009

(54) METHOD AND APPARATUS FOR ROTATING AND COMBINING A PLURALITY OF IMAGES FOR PRINTING ON SINGLE OR MULTIPLE SHEETS

(75) Inventor: Daisuke Asai, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 806 days.

(21) Appl. No.: 11/200,067

(22) Filed: Aug. 10, 2005

(65) Prior Publication Data
US 2006/0033953 A1    Feb. 16, 2006

(30) Foreign Application Priority Data
Aug. 10, 2004    (JP) ............................... 2004-233433

(51) Int. Cl.
G06K 15/02    (2006.01)
(52) U.S. Cl. ...................... 358/1.2; 358/1.12; 358/1.18; 358/488; 715/251; 382/297
(58) Field of Classification Search ................ 358/1.15, 358/488, 462, 450, 296, 400, 448, 499, 1.1, 358/1.12, 1.18; 382/224, 296, 297, 298, 382/299, 294; 715/251
See application file for complete search history.

(56) References Cited

U.S. PATENT DOCUMENTS

| 5,876,129 A | | 3/1999 | Suzuki |
|---|---|---|---|
| 5,959,744 A | * | 9/1999 | Kohri et al. ................. 358/450 |
| 5,960,229 A | * | 9/1999 | Fukuoka et al. ............... 399/17 |
| 6,041,205 A | | 3/2000 | Funada et al. |
| 6,130,965 A | * | 10/2000 | Kobayashi et al. .......... 382/284 |

(Continued)

FOREIGN PATENT DOCUMENTS

CN    1268436 A    10/2000

(Continued)

OTHER PUBLICATIONS

English (Machine) Translation of Japanese Patent 2003-143387, published May 16, 2003, translation obtained from Industrial Property Digital Library, <http://www.ipdl.inpit.go.jp/homepg_e.ipdl>, accessed Feb. 6, 2009.*

(Continued)

Primary Examiner—Kimberly A Williams
(74) Attorney, Agent, or Firm—Banner & Witcoff, Ltd (57) ABSTRACT

An information-processing device for combining a plurality of pages including image data to printing image data printed on one sheet, and converting the combined pages to input image data for a image forming device is disclosed. When a multi-page print instruction is issued, a data generation unit in the information-processing device sets a maximum number N for combining the pages to one sheet, determines the size and the orientation of the sheet to be fed to an image forming point in the image forming device, and reserves a data storing region in an image buffer for producing the printing image data. The data generation unit produces the printing image data having the same orientation as that of the sheet fed in the image forming device when combining the page. Therefore, a process for rotating the printing image data itself is not necessary.

5 Claims, 7 Drawing Sheets

U.S. PATENT DOCUMENTS

| | | | |
|---|---|---|---|
| 6,301,018 B1 * | 10/2001 | Maeda et al. | 358/449 |
| 6,507,415 B1 * | 1/2003 | Toyoda et al. | 358/450 |
| 2004/0095587 A1 * | 5/2004 | Brown et al. | 358/1.2 |
| 2005/0140991 A1 * | 6/2005 | Ogiwara et al. | 358/1.2 |

FOREIGN PATENT DOCUMENTS

| | | |
|---|---|---|
| CN | 1406181 A | 3/2003 |
| JP | 8317185 | 11/1996 |
| JP | 9018690 | 1/1997 |
| JP | 10013660 | 1/1998 |
| JP | 2000-039802 | 2/2000 |
| JP | 2000-332951 A | 11/2000 |
| JP | 2003-332951 | 11/2000 |
| JP | 2003-143387 | 5/2003 |

OTHER PUBLICATIONS

Translation of Office Action in Japanese Patent Application No. 2004-233433 dated Jul. 18, 2006.

Office Action in Chinese Patent Application No. 200510053149.7 dated Aug. 18, 2006.

* cited by examiner

METHOD AND APPARATUS FOR ROTATING AND COMBINING A PLURALITY OF IMAGES FOR PRINTING ON SINGLE OR MULTIPLE SHEETS

BACKGROUND OF THE INVENTION

1. Technical Field

The present invention relates to an information-processing device for combining a plurality of pages each of which includes image data and generating input image data for an image forming device, and a program therefor.

2. Related Art

Inkjet printers and laser printers are well-known as an image forming devices. Similarly, personal computers installed with Windows (trademark) as an operating system are known as information processing devices.

In general, the information processing device has a printing function to convert image data and/or character provided by an application such as graphics drawing and/or word-processing software into data (PDL data) which is understandable by the image forming device, and send the converted data with a print instruction to the image-forming device. In response to the print instruction, the image-forming device forms image on an A-4 size paper, based on the received data.

Japanese Patent Publication No. 2003-143387 discloses an information processing device having a multi-page printing function to combine a plurality of pages including image data generated by an application into one page data and print one page data on one sheet of paper. The multi-page printing function enlarges or compresses each of the plurality of pages including the image data, copies the resultant data to an image buffer, and then produces printing image data consisting of all of the plurality of pages in the image buffer. The multi-page printing function then converts the printing image data into input data for the image-forming device, and sends the resultant input data to the image-forming device.

The image-forming device feeds a sheet sequentially to an image forming point, and prints the input data on the sheet at the image forming point. In other words, the image-forming device prints the input data in sequence from the tip end of the sheet along the paper feeding direction. Thus, the multi-page printing function generates input data for the image-forming device in the order of printing the image.

Generally, image data to be printed on a sheet has an attribute called "orientation". The orientation specially means an orientation of the image with respect to the direction in which the image data is described. Particularly, the orientation indicates the direction of the longer-side of the page including the image data to be printed. If the longer-side of the page lies in the column direction, image data is in a portrait mode (designated as "portrait" hereinafter). If the longer-side of the page lies in the row direction, image data is in a landscape mode (designated as "landscape" hereinafter). In the present invention, it is assumed that the image information including the image data is described sequentially in the row direction.

When the plurality pages including image data have different orientations, the multi-page printing has to rearrange the orientations of pages in order to combine the plurality of pages into printing image data (multi-page data) in an image buffer. A conventional information processing device matches the orientation of each page being combined rather than the first page to that of the first page by rotating the page, if necessary. Thus, all of the orientations of the plurality of pages including image data are arranged to produce printing image data in the image buffer.

However, when producing the printing image data as described above, the information forming device does not consider which side of the sheet is along the paper feeding direction. After the printing image data is supplied to the image forming device, and it then becomes obvious that the orientation of the printing image data supplied from the information processing device is different from the orientation of the sheet fed to the image forming point, the printing image data is required to be rotated in order to match the orientation of the printing image data to that of the sheet.

In this case, the rotation process of image data is done twice, i.e., for combining the plurality of pages and matching the orientation of the printing image data with that of the sheet. Therefore, a problem arises in that the process to produce the input data for the image-forming device spends so much time.

An object of the present invention is to provide an information processing device to produce input data for an image-forming device in a short time when a multi-page printing function is used.

SUMMARY

The present invention provides an information processing device connectable with an image forming device that form an image based on input image data, on a unit of recording-medium having a size and an orientation, having: a data receiving unit, a recording-medium determining unit, a processing unit, a storage unit, and a controlling unit. The data receiving unit receives a plurality of pages to be printed the unit of recording-medium. Each of the plurality of pages has a size and an orientation, respectively. The a recording-medium determining unit determines the size and the orientation of the unit of recording medium. The processing unit combines a maximum number of pages among the plurality of pages by means of at least one of enlargement, reduction, and rotation processing in order to produce printing image data to be printed on the unit of recording medium, based on the determined size and orientation of the unit of recording medium. The storage unit stores the printing image data. The controlling unit reads out the printing image data stored in the storage unit and converts the printing image data into the input image data for the image forming device.

The present invention further provides an information processing device connectable with an image forming device that form an image based on input image data, the image forming device having a plurality of trays, each of the plurality of trays accommodating a plurality of units of recording medium, each of the plurality of units of recording-medium having a size and an orientation. The information processing device has a data receiving unit, a reference orientation setting unit, a maximum number setting unit, a recording-medium determining unit, a processing unit, a storage unit, a tray selecting unit, and a controlling unit. The data receiving unit receives a plurality of pages to be printed the unit of recording-medium. Each of the plurality of pages has a size and an orientation, respectively. The reference orientation setting unit determines a reference orientation for the plurality of pages. The maximum number setting unit sets a maximum number to be used to combine the maximum number of pages, according to a print instruction. The recording-medium determining unit determines an image data form having a predetermined size and a predetermined orientation, based on the reference orientation and the maximum number. The processing unit combines the maximum number of pages among the plurality of pages by means of at least one of enlargement, reduction, and rotation processing in order to produce printing image data having the image data form. The storage unit stores the printing image data. The tray selecting unit selects one of the plurality of tray which accommodates a unit of recording medium having the same size and orientation as the size and orientation of image data form. The controlling unit reads out the printing image data stored in the storage unit and converts the printing image data into the input image data for the image forming device. The input image data is formed on a unit of recording medium supplied from the selected tray.

BRIEF DESCRIPTION OF THE DRAWINGS

The aforementioned aspects and other features of the invention are explained in the following description, taken in connection with the accompanying drawing figures wherein.

DESCRIPTION OF THE EMBODIMENT

Embodiments according to the present invention will be described with reference to the accompanying drawings.

Figure 1A:
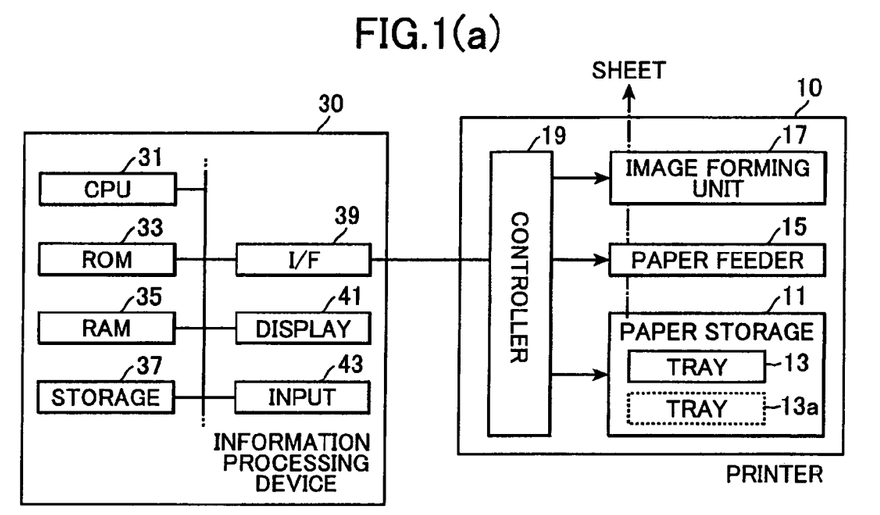
FIG. 1(a) is a block diagram showing an image formation system 1 according to the present invention.

Referring to FIG. 1, an image formation system 1 has a printer 10 and an information-processing device 30 connected to the printer 10 for communication therewith. The printer 10 forms image on a sheet. The information-processing device 30 produces image data being printed on a sheet fed by the printer 10 (designated as "printing image data hereinafter) and sends the printing image data to the printer 10 for printing.

The printer 10 has the similar structure as that of a conventional printers such as an inkjet printer and a laser printer. The printer 10 has a paper supply unit 11, a paper feed unit 15, an image-forming unit 17, and a controller 19. The controller 19 controls the paper supply unit 11, the paper feed unit 15, and the image-forming unit 17.

The paper supply unit 11 has a paper tray 13 for stacking rectangular sheets of paper P having a standard size such as A4. Generally, the sheets stacked in the paper tray 13 have a rectangular shape with a pair of longer sides and a pair of shorter sides. The uppermost sheet in the paper tray 13 is extracted in a predetermined direction and sent to the paper feed unit 15. The paper tray 13 is configured to send the sheet along either a longer-side direction or a shorter-side direction of the sheet.

The paper feed unit 15 feeds the sheet P from the paper supply unit 11 to an image forming point GP without changing the orientation of the sheet. It should be noted that the image forming point GP is a starting point for the image-forming unit 17 to form image on the sheet. The image-forming unit 17 is controlled by the controller 19 to form an image onto the sheet P at the image forming point GP in accordance with image data supplied from the information-processing device 30.

Figure 1B:
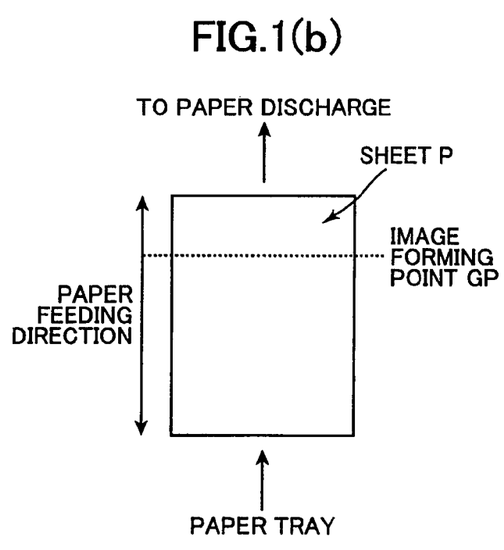
FIGS. 1(b) and 1(c) are views showing a paper feeding direction and an orientation of a sheet to be fed in a printer.
Figure 1C:
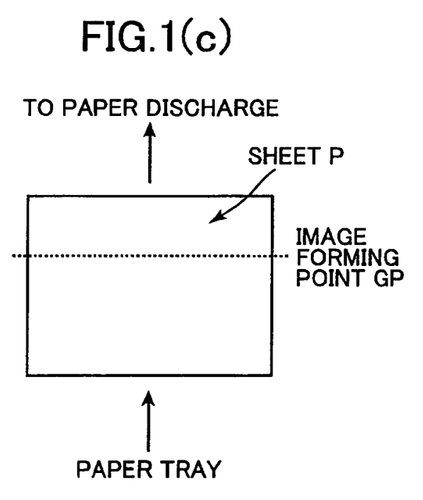

The sheet P is supplied to the image forming point GP in the same orientation as that of when the sheet P is fed from the paper supply unit 11. And the image is then formed on the sheet P in sequence in the sheet feeding direction. In other words, if the sheet P is fed along the longer-side direction thereof, the sheet P is supplied to the image forming point GP from the tip end thereof in the longer-side direction, as shown in FIG. 1(b). If the sheet P is fed along the shorter-side direction thereof, the sheet P is supplied to the image forming point GP from the tip end thereof in the shorter-side direction, as shown in FIG. 1(c).

If the printer 10 is an inkjet printer, the image-forming unit 17 scans a recording head to eject an ink droplet in the line direction perpendicular to the sheet feeding direction. And the printer 10 then forms the image on the sheet P for the predetermined line intervals with the recording head at the image forming point GP in the sheet feeding direction, based on the input image data.

If the printer 10 is a laser printer, the image-forming unit 17 functions at the image forming point GP as the contact point between a transfer body and an image supporter, to electrostatically transfer the toner image supported by the image supporter to the sheet P passing the start point and form the image on the sheet P. In this manner, the image-forming unit 17 forms the image on the sheet P in sequence in the paper feeding direction. The sheet P is discharged out of the printer through a paper discharge tray.

The controller 19 controls the paper supply unit 11, the paper feed unit 15, and the image-forming unit 17. The controller 19 is connected to the information-processing device 30 to communicate therewith. The controller 19 controls the image-forming unit 17 to generate an image in accordance with the printing image data transferred from the information-processing device 30. The printing image data transferred from the information-processing device 30 includes image information arranged in the main scanning direction of the image-forming unit 17. Therefore, the controller 19 reads the image information in the printing image data in sequence, and controls the image-forming unit 17 based on the image information.

The information-processing device 30 is provided with a CPU 31, a ROM 33, a RAM 35, a storage device 37, an interface 39, a display unit 41, and an input unit 43. The CPU 31 executes various computations. The ROM 33 stores various programs. The RAM 35 is used as a work area during the execution of programs by the CPU 31. The storage device 37 stores various types of applications and data such as graphics creation software and wordprocessor software. The storage device 37 also stores various kinds of information related to the connected printer 10 including the size and the orientation of the sheet therein. The interface 39 connects the information-processing device 30 and the printer 10 in order to communicate therebetween bidirectionally. The display portion 41 is formed of a liquid-crystal display device that displays various types of information. The input portion 43 consists of a keyboard or a pointing device.

Figure 2:
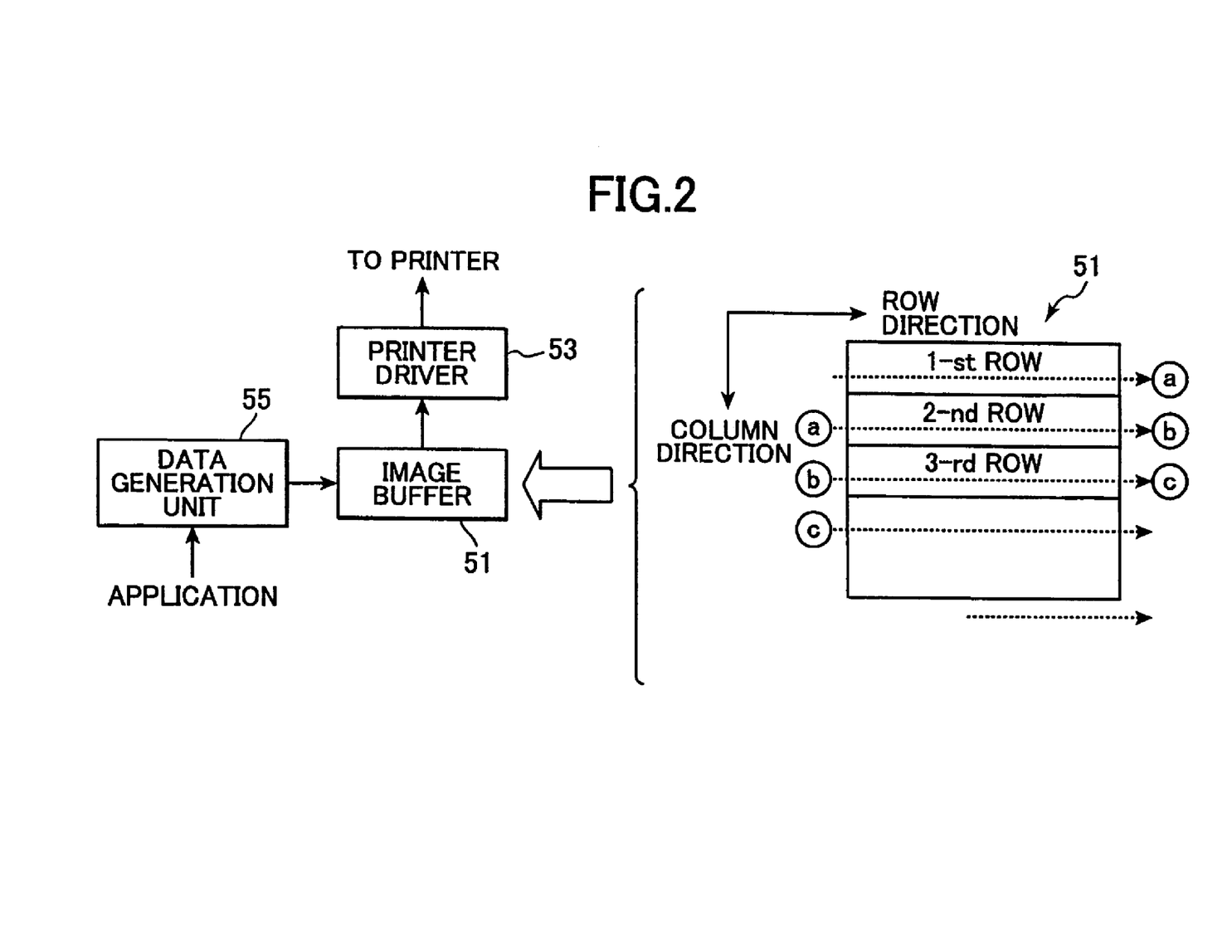
FIG. 2 is a functional block diagram showing an information-processing device 30.

FIG. 2 shows functions implemented by the CPU 31 with the various programs in the information-processing device 30. The information-processing device 30 has a data generation unit 55, an image buffer 51, and a printer driver 53 operationally. The data generation unit 55 produces the printing image data for the printer 10 in the image buffer 51. The image buffer 51 stores the printing image data. The printer driver 53 generates input image data sent to the printer 10 based on the printing image data stored in the image buffer 51.

The data generation unit 55 is activated by executing a predetermined program in response to print-instructions issued from an external task such as an application run by the CPU 31. The data generation unit 55 processes the image data being printed supplied from the application on a page basis to produce the printing image data for one sheet in the image buffer 51. In this embodiment, the page means a unit defined by an application installed in the information processing device 30, consisting of a predetermined amount of pixels.

The image buffer 51 provides a two-dimensional storage region consisting a matrix with rows and columns by means of a memory control program and the RAM 35. The image buffer 51 holds the printing image data for one sheet which has been generated by the data generation unit 55. In the image buffer 51, the stored image data is allocated with a memory address arranged in the row direction. In practice, the image data having image information (bits) arranged in the first row, the second row, the third row, and so on, is stored in sequence in the RAM 35.

The printer driver 53 reads out the printing image data reads out the printing image data in sequence in the row direction in the image buffer 51 (RAM 35) to convert the printing image data into input image data (PDL data) for one sheet for the printer 10. The printer driver 53 then sends the input image data through the interface 39 to the controller 19 of the printer 10.

Figure 3:
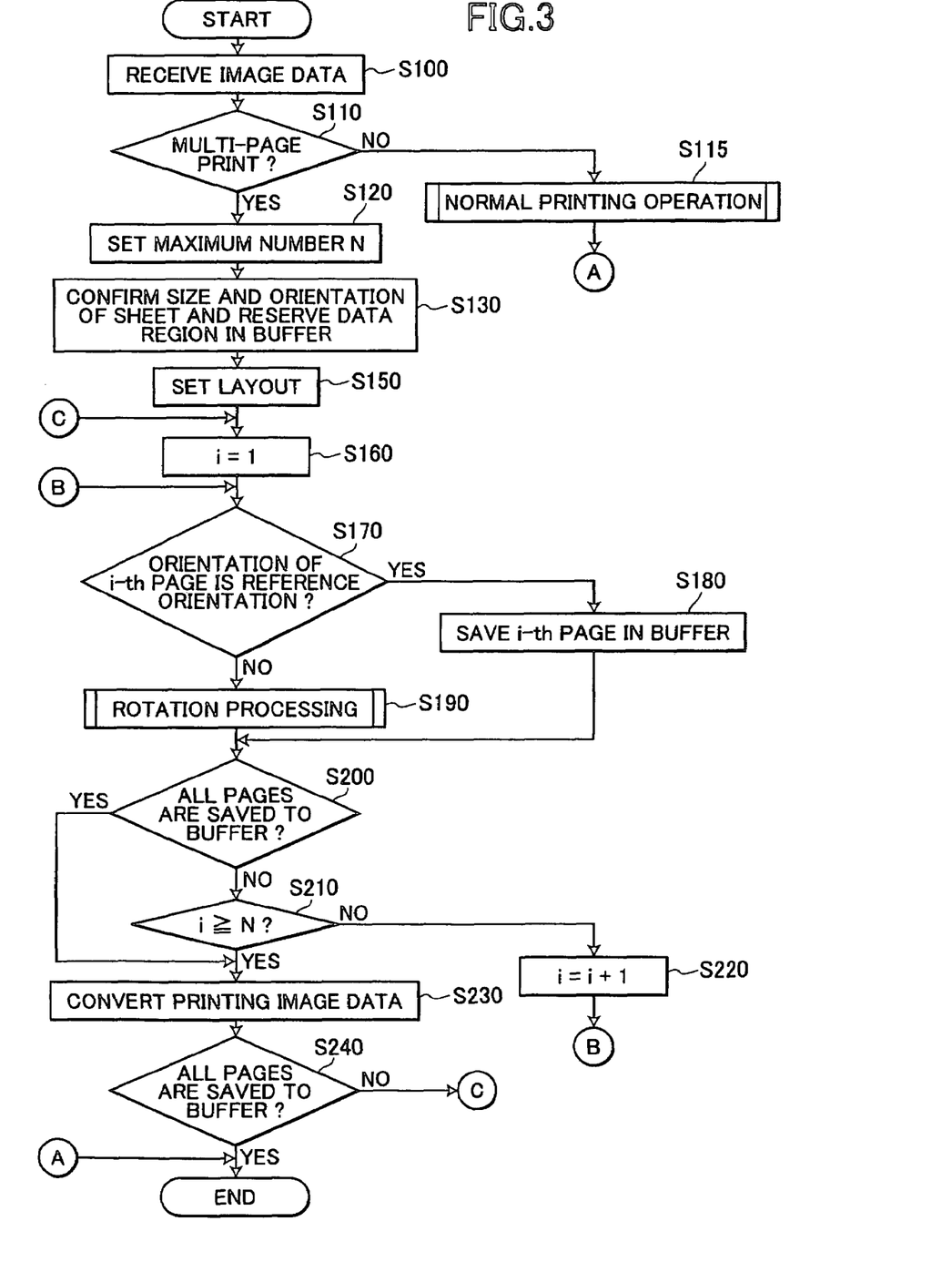
FIG. 3 is a flowchart of the data generation processing implemented by a data generation unit 55.

The description now turns to the data generation processing by the data generation unit 55, with reference to FIG. 3. In response to the print instruction issued by an application, the data generation unit 55 treats a plurality of pages including image data, each of which is supplied by the application, on a page basis to produce the printing image data being printed on the sheet and send the printing image data to the printer 10.

The data generation unit 55 fetches a group of image data being printed, supplied from the application (S100). The group of image data being printed consists of a plurality of pages, each of which includes image data to be printed. The data generation unit 55 subsequently determines whether the print-instruction is a multi-page print instruction (S110). In this embodiment, the multi-page print instruction is to combine a predetermined number (N) of pages, each of the pages includes image data generated by an application, into one sheet data and then print one sheet data on one sheet by the printer 10. The multi-page print instruction specifies the size and the orientation of sheet to be printed by the printer 10. If the instruction is not a multi-page print instruction (No in S110), the data generation unit 55 stores each of the plurality of pages including image data as the printing image data on a page basis in the image buffer 51. The data generation unit 55 then causes the printer driver 53 to convert the printing image data to input image data to be sent to the printer 10. The printer 10 prints the input image data by using a normal print processing (S115).

On the other hand, if the print-instruction is a multi-page print instruction (Yes in S110), the data generation unit 55 sets a maximum number N of the pages included in one sheet to be printed, which is used for combining the pages including image data into the printing image data, according to page specifying information in the multi-page print instruction (S120). It should be noted that the page specifying information specifies the maximum number of pages included on one sheet to be printed by the printer 10. This information is supplied to the information processing device 30 simultaneously when a user enters the print instruction through the input unit 43. If the multi-page print instruction is a two-in-one mode, the data generation unit 55 sets the maximum number N to 2.

The data generation unit 55 reads out paper information from the storage device 37 such as the size and the orientation of the sheet stacked in the paper tray 13. The data generation unit 55 then reserves a data storing region in the image buffer 51 for generating printing image data (S130).

In S130, the data generation unit 55 recognizes the size of the sheet P in the paper tray 13, and determines which orientation the sheet is fed with reference to the image forming point GP in portrait or in landscape. Depending on the determination of the sheet size and orientation, the data generation unit 55 sets the number of rows and the number of columns of the two-dimensional data storing region provided in the image buffer 51. In other words, the data generation unit 55 determines the orientation of the sheet fed to the image forming point GP. According to the orientation of the fed sheet, the data generation unit 55 sets the page size and the orientation of the printing image data, and reserves a corresponding data storing region in the image buffer 51.

More specifically, the data generation unit 55 sets the number of rows corresponding to the width of the sheet P at the image forming point GP and the number of columns corresponding to the length of the sheet P along the paper feeding direction, and reserves the data storing region having the same number of rows and the same number of columns in the image buffer 51.

For example, when the sheet is fed along the longer side thereof, the width of the sheet is equal to the length of the shorter side thereof, and the length of the sheet P along the paper feeding direction is equal to the length of the longer side thereof, as shown in FIG. 1(b). In this case, the sheet is fed in a portrait in the printer 10 (FIG. 1(b)). On the other hand, when the sheet is fed along the shorter side thereof, the width of the sheet is equal to the length of the longer side thereof, and the length of the sheet P along the paper feeding direction is equal to the length of the shorter side thereof, as shown in FIG. 1(c). In this case, the sheet is fed in a landscape in the printer 10 (FIG. 1(c)).

In this embodiment, the orientation of the page is determined with reference to the arranging direction of the image information (bits) forming the image data, i.e., the row direction. Particularly, the orientation indicates the direction of the longer sides of the sheet and the page. In this embodiment, when the longer side of the sheet and the page is set parallel to the column direction (in other words, the number of rows is greater than the number of columns), the orientation thereof is determined as "portrait." On the other hand, when the longer side of the sheet and the page is set parallel to the row direction (in other words, the number of columns is more than the number of rows), the orientation thereof is determined as "landscape."

When the processing of S130 is over, the data generation unit 55 determines the page layout, i.e., the arrangement of the pages on the sheet, based on the maximum number N set in S120. In other words, the data generation unit 55 determines the proper orientation of the page being printed on the sheet, based on the maximum number N and the orientation of the sheet to be fed in the printer 10 (S150).

Figure 4A:
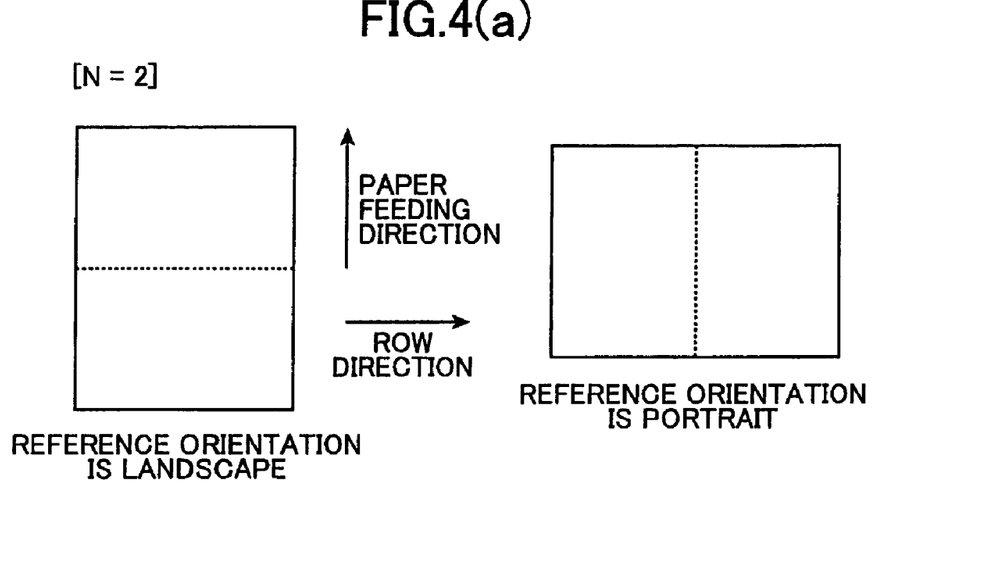
FIGS. 4(a) and 4(b) are views illustrating a relationship between a maximum number N, a reference orientation, and the orientation of the sheet.
Figure 4B:
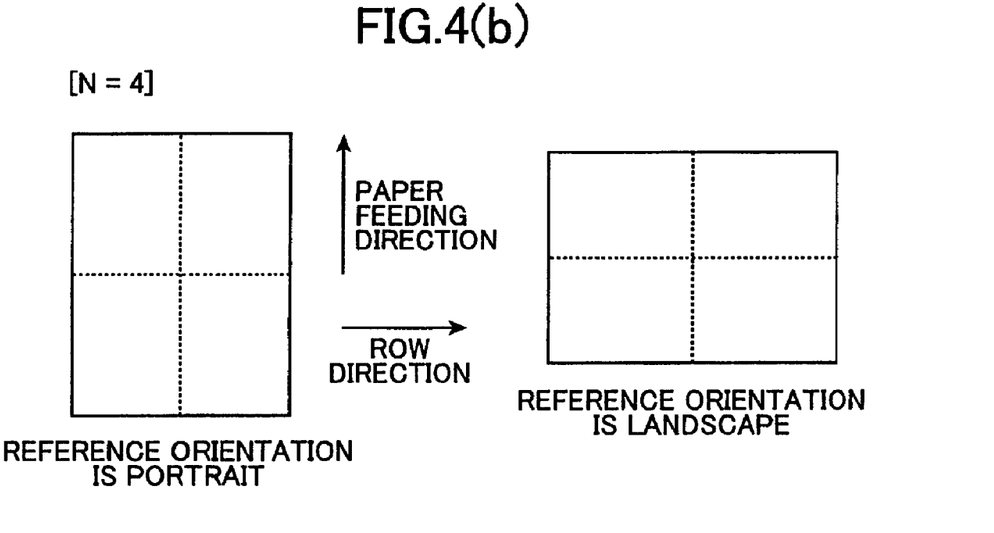

Referring to FIG. 4, the description now turns to the method of determining the orientation of the page at the time of producing the printing image data.

If the orientation of the printing image data is in the portrait and N is 2, each of the page being printed on the sheet is set to be in the "landscape", as shown in FIG. 4(a). If N is 4, the orientation of the page being printed on the sheet is set to be in the "portrait", as shown in FIG. 4(b). In this embodiment, the orientation of the page being printed on the sheet is designated as "combining reference orientation".

On the other hand, if the orientation of the printing image data is in the landscape and N=2, the combining reference orientation is set to be in the portrait, as shown in FIG. 4(c). If N=4, the orientation of the combining reference orientation is set to be in the landscape, as shown in FIG. 4(d).

As described above, the combining reference orientation is established depending on the maximum number of N and the orientation of the sheet to be fed in the printer 10.

When the processing of S150 ends, the data generation unit 55 sets a variable i to 1 (S160). The data generation unit 55 then selects the first page among a plurality of pages (a maximum of N pages) to be printed. The data generation unit 55 determines whether the orientation of the first page matches the combining reference orientation (S170).

If the data generation unit 55 determines that the orientation of the first page matches the combining reference orientation (Yes at S170), the data generation unit 55 writes the image data included in the first page to the data storing region allocated for the first page in the image buffer 51 (S180). In other words, at S180, the data generation unit 55 scales the size of image data included in the first page to the size of the data storing region allocated to the first page, and copies the scaled image data into the allocated data storing region in the image buffer 51.

Figure 5:
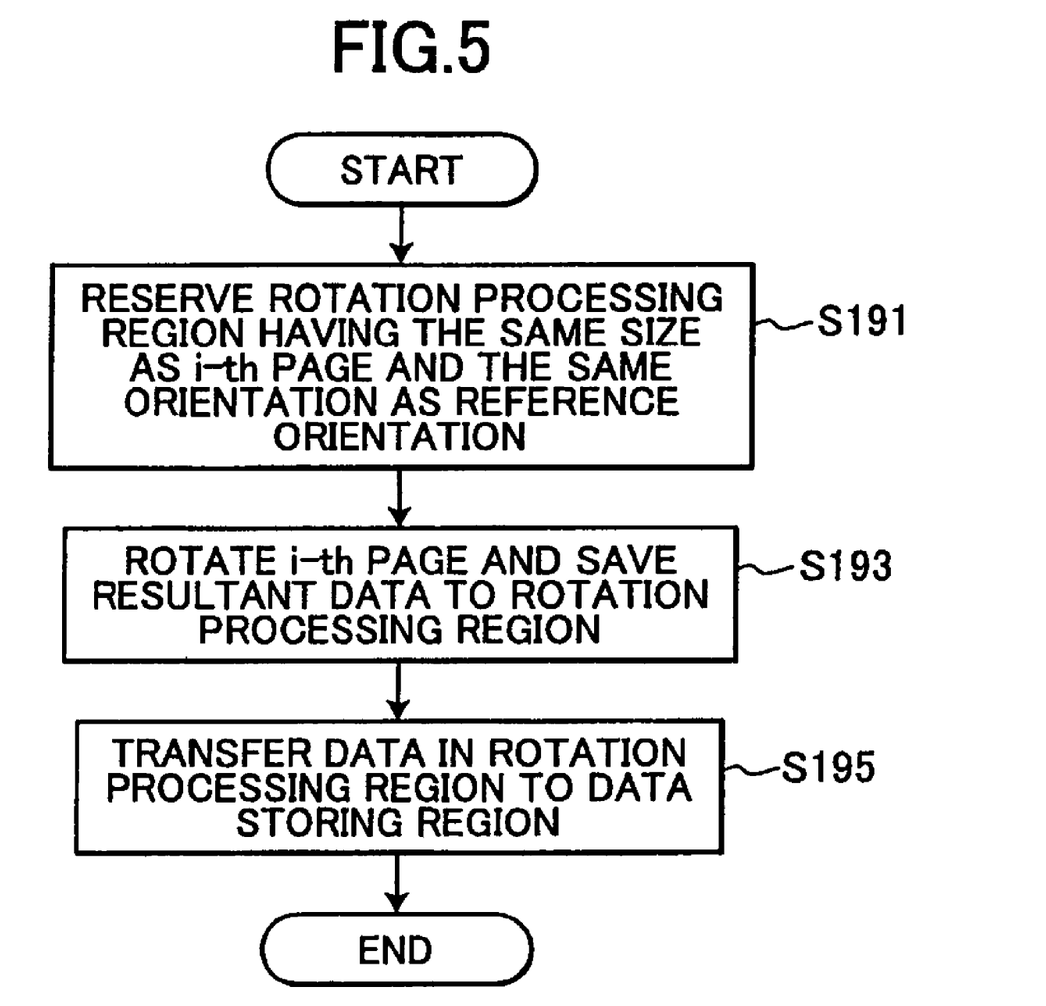
FIG. 5 is a flowchart showing the rotation processing implemented by the data generation unit 55.

On the other hand, if the data generation unit 55 determines that the orientations of the first page does not match the combining reference orientation (No at S170), the data generation unit 55 goes to the step 190 in order to execute the rotation writing process shown in FIG. 5 (S190).

In the rotation writing process, the data generation unit 55 reserves a rotation processing region in the image buffer 51 having the same size as that of the first page and the same orientation as that of the combining reference orientation (S191).

In S191, the data generation unit 55 exchanges the number of columns and the number of rows to provide the rotation processing region for storing the first page.

The data generation unit 55 then rotates the first page by 90 degrees in order to match the orientation of the first page to the combining reference orientation. The data generation unit 55 writes the resultant data onto the rotation processing region in the image buffer 51 (S193).

When the processing ends at S193, the data generation unit 55 reads out the rotated first page from the rotation processing region in the image buffer 51, and then transfers the thus-read page to the data storing region allocated for the first page in the image buffer 51 (S195).

At S195, the data generation unit 55 scales the image data included in the first page to the size of the data storing region allocated to the first page, and copies the scaled image data into the allocated data storing region in the image buffer 51. When the processing of S195 ends, the data generation unit 55 ends the rotation writing process, and goes to S200.

In S200, the data generation unit 55 determines whether all the pages including image data being printed has been written to the image buffer 51. If the data generation unit 55 determines that all the pages have not copied to the image buffer 51 (No at S200), the data generation unit 55 determines whether the variable i is equal to the maximum number N (S210).

If the data generation unit 55 determines that the variable i is less than the maximum number N (No at S210), the data generation unit 55 increments the variable i by 1 (S220) and then goes back to S170.

If the data generation unit 55 determines that all the page to be printed have been written to the image buffer 51, or that the variable i has become equal to the maximum number N at S210, the data generation unit 55 finishes the writing of the page to the data storing region in the image buffer 51. At this time, the data generation unit 55 finishes producing the printing image data in the image buffer 51, having the number of rows and the number of columns determined at S130.

Subsequently, the data generation unit 55 reads out the printing image data from the image buffer 51 in the row direction, and sends the printing image data to the printer driver 53. The printer drive 53 then converts the printing image data into input image data, and sends the input image data to the printer 10 (S230). When the printer 10 receives the input image data, the printer 10 forms image on the sheet P based on the input image data. In other words, the printer 10 forms images included in the plurality of pages on one sheet. For example, if N=2, two types of image included in two pages are formed on one sheet. If N=4, four types of image included in four pages are formed on one sheet.

When the processing of S230 is over, the data generation unit 55 determines whether all of pages have been written to the image buffer 51 in S240. If the data generation unit 55 determines that all the pages have not been written into the image buffer 51 (No at S240), the data generation unit 55 causes the process to go back to S160 in order to form image on the next sheet. The data generation unit 55 starts combining other pages to produce another printing image data by using the data storing region in the image buffer 51 for the next sheet (S160 to S220).

On the other hand, if the data generation unit 55 determines that all the pages have written to the image buffer 51 (Yes at S240), the data generation processing is over.

As described above, the information-processing device 30 first sets the size and the orientation of the printing image data being printed on one sheet in the image buffer 51, based on the size and the orientation of the sheet fed to the image forming point GP and the maximum number of pages included in the sheet, and then transfer the page including image data to the image buffer 51. In this case, if the orientation of the page is different from that of combining reference orientation defined according to the number of N and the orientation of the sheet, the page is rotated in order to match the orientation thereof to that of the combining reference orientation. The information-processing device 30 therefore does not need to rotate the printing image data after the printing image data is produced in the image buffer 51, because the orientation of the printing image data conforms to the orientation of the sheet P for printing. In other words, in order to form the input image data for the printer 10, the number of rotation processes for image data included in the page can be reduced.

Thus, the information-processing device 30 can generate the input image data for the printer 10 rapidly.

Figure 6:
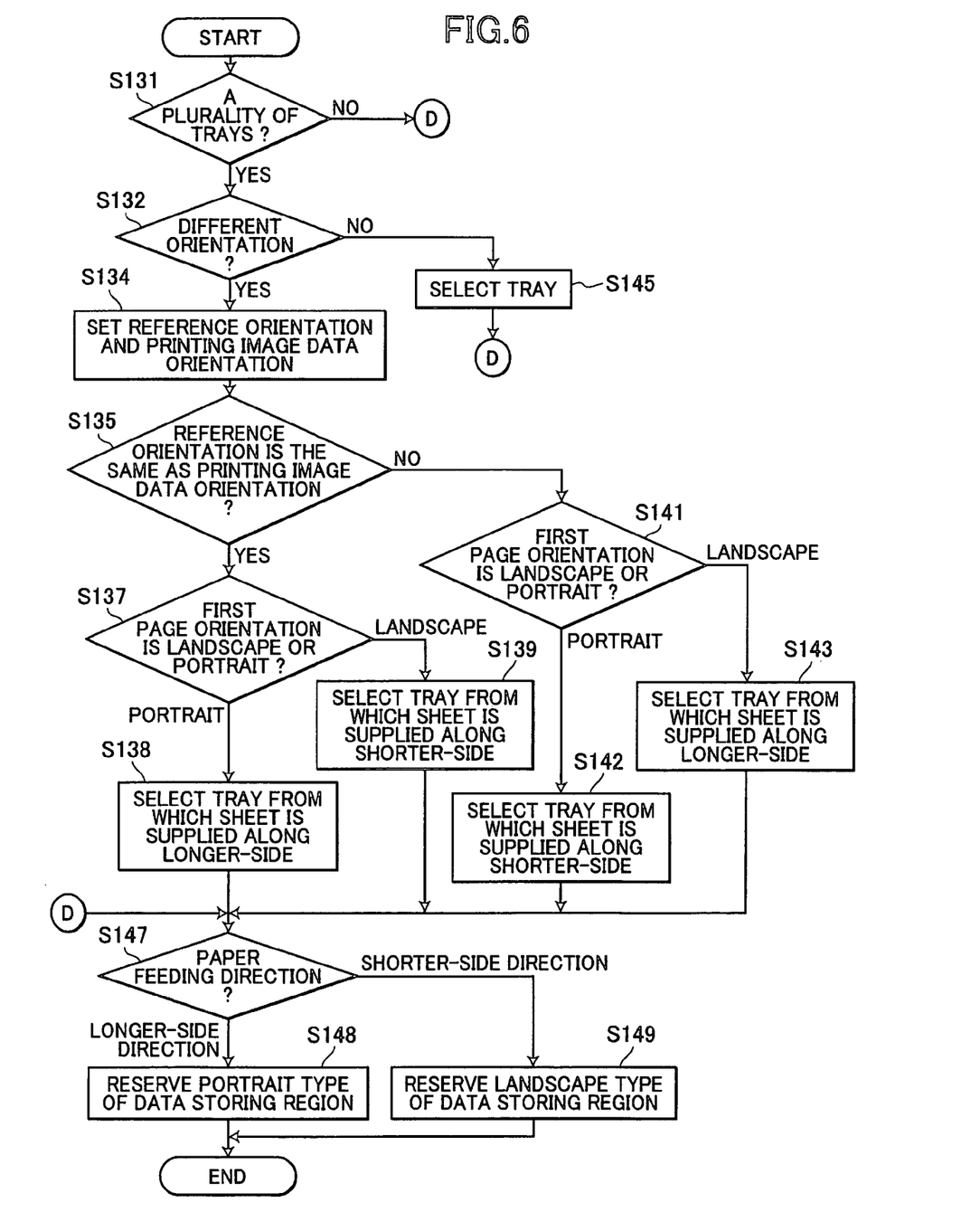
FIG. 6 is a flowchart showing a processing to reserve data storing region.

The next description will be made for explaining the second embodiment of the present invention. In this embodiment, the printer 10 has a plurality of paper trays. It is assumed that each of the plurality of paper trays includes the same size of sheets as each other. Referring to FIG. 6, the tray selecting processing to select the paper tray will be described. It should be noted that other processing executed by the data generation unit 55 is the same as that of the first embodiment, so that the description of the same processing is omitted hereinafter.

During the region setting processing, the data generation unit 55 determines whether the plurality of paper trays 13 and 13a is installed in the printer 10 based on tray information stored in the storage device 37 (S131). The tray information includes the number of paper trays provided in the printer 10 and the size and the orientation of sheets stacked in each of the paper trays. The tray information is produced by a user by using a setting program.

In S131, if the data generation unit 55 determines that the plurality of paper trays 13 and 13a is installed in the printer 10, the data generation unit 55 goes to S147 to identify the orientation of the sheet P supplied to the image forming point GP based on the paper information (S147). If the data generation unit 55 determines that the sheet P is supplied to the image forming point GP along the longer-side thereof, the data generation unit 55 sets the size of the printing image data to the size of the sheet P, and sets the orientation of the printing image data to portrait. The data generation unit 55 reserves a data storing region having the same number of columns and the same number of rows as those of the portrait type of printing image data in the image buffer 51 (S148).

If the sheet P is supplied to the image forming point GP along the shorter-side thereof, the data generation unit 55 sets the size of the printing image data to the size of the sheet P, and sets the orientation of the printing image data to landscape. The data generation unit 55 reserves a data storing region having the same number of columns and the same number of rows as those of the landscape type of printing image data in the image buffer 51 (S149). When the data storing region is reserved in the image buffer 51, the data generation unit 55 goes to the next step S150.

If the system determines in S131 that the plurality of paper trays 13 and 13a is installed in the printer 10, the data generation unit 55 moves on to S132 to determine whether the sheet stacked in the paper tray 13a has the same orientation as that of the sheet in the paper tray 13, based on the tray information. In other words, the data generation unit 55 determines whether the printer 10 is provided with two types of paper trays: a tray from which the sheet P is fed in the longer-side thereof, and another tray from which the sheet P is fed in the shorter-side thereof.

If the data generation unit 55 determines that the sheets stacked in the trays 13 and 13a have the same orientation (No at S132), the data generation unit 55 selects one of the paper trays 13 and 13a in response to the print instruction. The data generation unit 55 causes the printer 10 to select the paper tray. The printer 10 then send the sheet from the selected paper tray to the image forming point GP (S145). Subsequently, the data generation unit 55 moves on to S147. Depending on the orientation of the sheet, the data generation unit 55 reserves the data storing region in the image buffer 51 (S148 and S149).

If the data generation unit 55 determines that the sheets stacked in the paper tray 13a has a different orientation from that of the sheets in the paper tray 13 (Yes at S132), the data generation unit 55 sets the orientation of the printing image data and a combining reference orientation, according to the maximum number N (S134).

In S135, the data generation unit 55 determines whether the orientation of the printing image data matches the combining reference orientation. If the data generation unit 55 determines that the combining reference orientation is the same as the orientation of the printing image data (Yes at S135), the data generation unit 55 determines that which orientation the first page from among the plurality of pages to be printed has a portrait or a landscape, at S137. If the orientation of the first page is the portrait, the data generation unit 55 selects the paper tray from which the sheet P is supplied to the image forming point GP along the longer-side thereof, based on the tray information. The data generation unit 55 sends the above instruction to select the paper tray to the printer 10 (S138). In response to the instruction, the sheet having a portrait orientation is sent to the image forming point GP in the printer 10.

If the data generation unit 55 identifies that the orientation of the first page is the landscape, the data generation unit 55 selects the other paper tray from which the sheet P is supplied to the image forming point GP along the shorter-side thereof, based on the tray information. The data generation unit 55 then sends the above instruction to the printer 10. In response to the instruction, the sheet having a landscape orientation is sent to the image forming point GP (S139).

On the other hand, if the data generation unit 55 identifies that the reference orientation is different from the orientation of the printing image data (No at S135), the data generation unit 55 identifies the orientation of the first page among the plurality of pages to be printed, at S141. If the orientation of the first page is portrait, the data generation unit 55 selects the paper tray from which the sheet P is supplied to the image forming point GP along the shorter-side thereof, based on the tray information, and sends this instruction to the printer 10. In the response to this instruction, the printer 10 supply the sheet P from the selected paper tray to the image forming point GP (S142).

If the orientation of the first page is landscape at S141, the data generation unit 55 selects the paper tray from which the sheet P is supplied to the image forming point GP along the longer-side thereof, based on the tray information, and send this instruction to the printer 10. In the response to this instruction, the printer 10 supply the sheet P from the selected paper tray to the image forming point GP (S143).

As described above, the paper tray to feed the sheet to the image forming point GP is selected. After the paper tray is selected, the data generation unit 55 moves on to S147. In S147, the data generation unit 55 identifies the orientation of the sheet stacked in the selected paper tray. According to the size and orientation of the sheet, the data generation unit 55 reserves a corresponding data storing region in the image buffer 51 (S148 or S149).

Subsequently, the data generation unit 55 finishes the tray selecting processing and then moves on to S150. After that, the data generation unit 55 starts combining the printing image data by using the data storing region in the image buffer, according to the processing shown in FIG. 3.

Figure 7A:
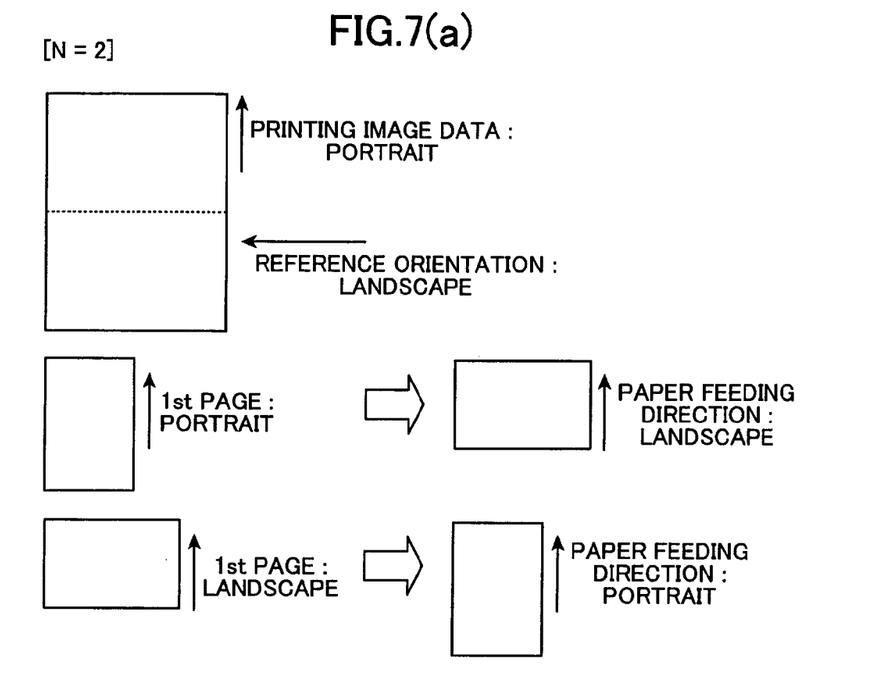
FIGS. 7(a) and 7(b) are views illustrating a relationship between a maximum number N, a reference orientation, and the orientation of the sheet.

FIGS. 7(a) and 7(b) show the orientation of the page and the sheet selected in the tray selecting processing. As shown in FIG. 7(a), if the maximum number N is 2, the combining reference orientation is perpendicular to the orientation of the printing image data. For example, the combining reference orientation is the portrait, the printing image data having a landscape orientation is produced.

In the above case, if the orientation of the first page is assumed to be portrait, the rotation processing for the first page is not necessary in order to match the first page to the combining reference orientation. Therefore, the printing image data is generated rapidly.

If N is 2, the printing image data has the portrait orientation, and the first page has the landscape orientation, the rotation process for the first page is not necessary.

Figure 7B:
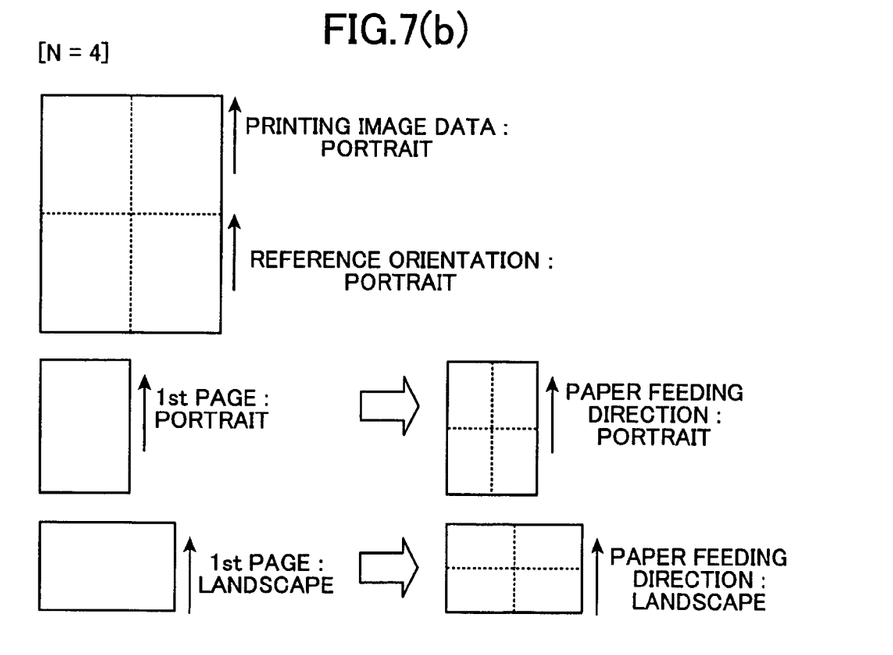

If N is 4, the combining reference orientation is the same as that of the printing image data. Therefore, if the orientation of the first page is portrait, the image-processing device 30 generates printing image data having the portrait orientation, as shown in FIG. 7(b). If the orientation of the first page is landscape, the image-processing device 30 generates the printing image data having the landscape orientation. Accordingly, the processing for rotating the first page is not necessary, so that the printing image data can be generated rapidly.

It should be noted that the information-processing device and program of the present invention is not limited to the above-described embodiments. Accordingly, a lot of modifications and variations have fallen into the scoped of the present invention.

In another embodiment, the data generation unit 55 can select the paper tray based on the maximum number of N and the orientation of the first page. In this case, the number of the rotation processing for the page can be reduced, thereby enabling rapid generation of the printing image data.

In another embodiment, the data generation unit 55 checks all the orientations of pages to be printed, and selects the paper tray based on the maximum number of orientations of pages. Therefore, the data generation unit 55 can reduce the number of executions of the rotation processing.

What is claimed is:

1. An information processing device connectable with an image forming device that feeds a unit of recording-medium in a feeding direction to form an image thereon, the unit of recording-medium having a rectangular shape having a longer side and a shorter side, comprising:
    a data receiving unit that receives a plurality of pages, each of the plurality of pages having a size and an orientation, the orientation being one of portrait and landscape;
    a feeding side determining unit that determines which side of the unit of recording-medium is parallel to the feeding direction;
    a layout setting unit that divides the unit of recording-medium by a number of pages, based on a result of the feeding side determining unit, to establish a layout having the same number of areas as the number of pages, the number of pages defining the number of pages to be printed on a single unit of recording-medium, and each of the areas being used for receiving one of the plurality of pages;
    a processing unit that modifies each of the number of pages by means of at least one of enlargement, reduction, and rotation processing in order to fit to a corresponding area of the layout and produce printing image data;
    a storage unit that stores the printing image data; and
    a controlling unit that reads out the printing image data stored in the storage unit and converts the printing image data into the input image data for the image forming device.

2. The information processing device according to claim 1, wherein the processing unit comprises:
    a maximum number setting unit that sets a maximum number of pages to be printed on a single unit of recording medium, according to a print instruction;
    an orientation determining unit that determines an orientation of a first one of the plurality of pages and a reference orientation for the first one of the plurality of pages, based on the maximum number of pages and the orientation of the unit of recording medium;
    a first unit that determines whether a next one of the plurality of pages has a same orientation as the reference orientation;
    a second unit that rotates the next one of the plurality of pages in order to have the same orientation as the reference orientation, if the next one of the plurality of pages does not have the same orientation as the reference orientation;
    a third unit that repeats the operations of the first and second units for a remainder of the maximum number of pages; and
    a fourth unit that writes the maximum number of pages having the same orientation as the reference orientation to the storage unit.

3. A computer program recorded on a computer readable recording medium, executed by a personal computer, comprising: instructions for implementing the information processing device according to claim 1.

4. An information processing device connectable with an image forming device that forms an image based on input image data, the image forming device having a plurality of trays, each of the plurality of trays accommodating a plurality of units of recording medium, each of the plurality of units of recording-medium having a size and an orientation, comprising:
    a data receiving unit that receives a plurality of pages to be printed on the unit of recording-medium, each of the plurality of pages having a size and an orientation, respectively, the orientation being one of portrait and landscape;
    a reference orientation setting unit that determines a reference orientation for the plurality of pages;
    a maximum number setting unit that sets a maximum number of pages to be printed on a single unit of recording medium, according to a print instruction;
    a layout setting unit that divides the unit of recording-medium by the maximum number of pages, to establish a layout having the same number of areas as the maximum number of pages, and each of the areas being used for receiving one of the plurality of pages;
    a processing unit that modifies each of the maximum number of pages by means of at least one of enlargement, reduction, and rotation processing in order to fit to a corresponding area of the layout and produce printing image data having the image data form;
    a storage unit that stores the printing image data;
    a tray selecting unit that selects one of the plurality of trays which accommodates a unit of recording medium having the same size and orientation as the size and orientation of image data form; and
    a controlling unit that reads out the printing image data stored in the storage unit and converts the printing image data into the input image data for the image forming device, wherein the input image data is formed on a unit of recording medium supplied from the selected tray.

5. A computer program recorded on a computer readable recording medium, executable by a personal computer to implement the information processing device according to claim 4.

* * * * *

UNITED STATES PATENT AND TRADEMARK OFFICE
CERTIFICATE OF CORRECTION

PATENT NO.       : 7,612,908 B2                                    Page 1 of 1
APPLICATION NO. : 11/200067
DATED            : November 3, 2009
INVENTOR(S)      : Daisuke Asai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1070 days.

Signed and Sealed this

Fourteenth Day of December, 2010

David J. Kappos
*Director of the United States Patent and Trademark Office*